United States Patent [19]

Ohmi et al.

[11] Patent Number: 5,661,421
[45] Date of Patent: Aug. 26, 1997

[54] SEMICONDUCTOR INTEGRATED DATA MATCHING CIRCUIT

[75] Inventors: Tadahiro Ohmi; Tadashi Shibata; Koji Kotani, all of Miyagi-ken, Japan

[73] Assignees: Tadashi Shibata; Tadahiro Ohmi, Japan; a part interest

[21] Appl. No.: 507,473

[22] PCT Filed: Feb. 22, 1994

[86] PCT No.: PCT/JP94/00263

§ 371 Date: Sep. 29, 1995

§ 102(e) Date: Sep. 29, 1995

[87] PCT Pub. No.: WO94/19761

PCT Pub. Date: Sep. 1, 1994

[30] Foreign Application Priority Data

Feb. 22, 1993 [JP] Japan .................. 5-057748

[51] Int. Cl.$^6$ ................... A03K 5/22; G06G 7/60
[52] U.S. Cl. ................... 327/63; 395/24
[58] Field of Search ................... 395/21, 24, 27; 327/63, 85, 90; 326/35, 36

[56] References Cited

U.S. PATENT DOCUMENTS

| | | | |
|---|---|---|---|
| 5,168,551 | 12/1992 | Jeong | 395/27 |
| 5,237,210 | 8/1993 | Castro | 395/24 |
| 5,258,657 | 11/1993 | Shibata et al. | 395/24 |
| 5,336,937 | 8/1994 | Sridhar et al. | 395/24 |
| 5,381,516 | 1/1995 | Devos et al. | 395/27 |
| 5,394,511 | 2/1995 | Masahiko | 395/27 |
| 5,448,682 | 9/1995 | Chung et al. | 395/27 |
| 5,521,858 | 5/1996 | Shibata et al. | 365/185.03 |

FOREIGN PATENT DOCUMENTS 4-98472  3/1992  Japan .

OTHER PUBLICATIONS

Touretsky, "Pulse–Firing neural chips for hundreds for neurons", Advances in Neural Information Processing systems 2, pp. 785–792 1990.

Touretzky, "Programmable analog Pulse–Firing neural networks", Advances in Neural Information Processing Systems I, pp. 671–677 1989.

*Primary Examiner*—Timothy P. Callahan
*Assistant Examiner*—My-Trang Nu Ton
*Attorney, Agent, or Firm*—Baker & Daniels

[57] ABSTRACT

A semiconductor integrated circuit for effecting data matching at high speed is provided in a simple circuit. The semiconductor integrated circuit includes a first input terminal and a second input terminal to which first and second voltage signals representing first and second values are inputted, respectively, and an output terminal. A predetermined output signal is produced at the output terminal when the difference between the first and second values is smaller than a predetermined difference value. The semiconductor integrated circuit of this invention comprises first and second inverters, each inverter comprising neuron MOS transistors having a plurality of input gates. The first and second signals or, first and second processed signals obtained by applying predetermined processing to the first and second signals, are inputted to at least one of the input gates of the inverters.

5 Claims, 9 Drawing Sheets

SEMICONDUCTOR INTEGRATED DATA MATCHING CIRCUIT

BACKGROUND OF THE INVENTION

1. Field of the Invention

The present invention relates to a semiconductor integrated circuit, and in particular, relates to a data matching circuit (a signal agreement/non-agreement detection circuit) which determines whether the difference between values expressed by two signals is smaller than a predetermined value or not.

2. Related Art

In the fields of data processing and automated control, the comparison of data expressed as numerical values, and a determination of agreement or non-agreement (whether the difference between the values is within a pre-specified range or not) plays an extremely important role. For example, in the field of image processing, when the checking of image data is conducted, the image is divided into a number of picture elements, and a determination is made as to whether the various picture element data are in agreement with (match) a value serving as a standard which is recorded in advance, and if the number of picture elements among all the picture elements which are in agreement is above a predetermined number, the image is determined to be identical to a recorded image. Accordingly, it is necessary to rapidly execute a determination of agreement/non-agreement for an extremely large number of picture element data. In consideration of a broad range of applications, it is necessary that the recorded value which serves as the standard of comparison be variable. Conventionally, with respect to such uses, functions were realized by means of software using a computer. However, the data matching function realized using software was slow in operation, and it was impossible to employ such a function in the field of image processing and the like, which requires high-speed operation.

In order to execute data matching at high speed, realization in terms of hardware (electrical circuits) is necessary. By means of installing a plurality of data-matching circuits, realized in terms of hardware (electrical circuits), and operating these in parallel, it is possible to execute an extremely large number of data matchings at high speed. When constructing matching circuits using hardware employing conventional technology, the circuitry is complex, and a large number of elements is required, so that the surface occupied by the circuits becomes undesirably large. Accordingly, there is a limit to the number of matching circuits which could be installed on a single semiconductor chip, and when conducting the matching of image data such as that described above, it was essentially impossible to produce an integrated circuit chip on which matching circuits corresponding to a number of picture elements were installed and parallel processing was conducted so as to conduct matching at high speed.

The present invention has as an object thereof to provide a semiconductor integrated circuit which is capable of conducting high-speed data matching employing simple circuitry.

SUMMARY OF THE INVENTION

The semiconductor integrated circuit which solves the above-described problem comprises a semiconductor integrated circuit possessing at least one first input terminal and at least one second input terminal into which a voltage signal is inputted, and at least one output terminal, wherein a predetermined signal is outputted at the output terminal when the difference between values expressed by the two signals inputted into the first and second input terminals becomes smaller than a predetermined value, characterized in that at least two inverters constituted of neuron MOS transistors are contained, and the two signals or signals obtained by applying predetermined processing to the two signals are inputted into at least one of the input gates of the inverters.

In the present invention, inverter circuits constituted of neuron MOS transistors are employed. Hereinafter, what is meant by a "neuron MOS transistor" is a semiconductor device possessing a semiconducting region of one conductivity type on a substrate, possessing source and drain regions of an opposite conductivity electrode which is provided via an insulating film on a region isolating the source and drain regions and which is in a potentially floating state, and possessing a plurality of input gate electrodes which are capacitively coupled with the floating gate electrode via an insulating film. The addition or subtraction of two analog or digital signal voltages can be conducted in a simple manner, so that the circuitry is simple, and the surface area occupied by one circuit is reduced, so that it is possible to integrate a large number of matching circuits. Furthermore, because the circuitry is simple, high-speed operation is possible, and it is possible to realize an ultra-high-speed data matching circuit.

(Description of the References)

101, 103 N-channel neuron MOS transistors,
102, 104 P-channel neuron MOS transistors,
105, 106 floating gates,
107, 108, 109, 110 input gates,
111 common inverter circuit,
112 input,
113 circuit output,
114 analog inverter,
115 input terminal,
116 inversion voltage signal,
124 vMOS inverter,
125 vMOS inverter, which is connected to 110, which is the input gate electrode of 125,
121 output, 122 terminal,
124 νMOS inverter,
201 silicon substrate,
202, 203 source and drain formed by N⁺ dispersion layers,
204 gate insulating film,
205 channel region,
206 floating gate electrode,
207 insulating film,
208a, 208b, 208c, 208d input gates,
301, 302 νMOS inverters,
303 analog inverter,
301 νMOS inverter,
304 input gate,
305 input gate,
308 control switch,
307 input gate,
309 analog inverter,
311 electrode,
310 standard inverter,
312 input gate electrode,
313 floating gate electrode,
309 analog inverter,
402 νMOS inverter,
403 input gate 403,
404 input gate,
405 floating gate,
501, 502 νMOS inverters,
503, 504, 505, 506 input gates,
508 standard inverter,
509 AND circuit,
601, 602 waveforms,
701, 702 waveforms,
703, 704, 705, 706 waveforms,
801, 802, 804, 805, 806, 807 input gate electrodes,
808, 809 digital inverters.

DETAILED DESCRIPTION OF THE INVENTION

Hereinbelow, the present invention will be explained in detail using embodiments; however, it is of course the case that the present invention is in no way limited to these embodiments.

(Embodiment 1)

A first embodiment of the present invention will be explained using the circuits shown in FIG. 1.

The present circuit outputs "1" (the power source voltage $V_{DD}$ of the circuit) when the difference in the voltages of the two analog voltage signal inputs $V_x$ and $V_y$ is within a range of $\pm\delta$.

In the Figure, reference numerals 101 and 103 indicate N-channel neuron MOS transistors, while references 102 and 104 indicate P-channel neuron MOS transistors. A neuron MOS transistor which functions in the same way as neurons which are the nerve cells which comprise the human brain; these are MOS-type transistors which are completely new in concept and were invented in order to realize neuron computers (inventors: Tadashi Shibata, Tadahiro Ohmi, Japanese Patent Application, Provisional Publication, No. Hei 3-6679). Hereinbelow, such transistors will be referred to as "νMOS". These "νMOS" are transistors having extremely powerful functions; it is an important characteristic of the present invention that such νMOS are employed as the basic elements. The structure and function of such νMOS will be explained using FIG. 2.

The drains of a N-channel νMOS (abbreviated to "N-νMOS") and a P-channel νMOS (abbreviated to "P-νMOS") are connected to one another, and this forms an inverter circuit of a CMOS structure employing neuron MOS. This is termed a "Complementary νMOS inverter", or is abbreviated to a C-νMOS inverter Reference numerals 105 and 106 indicate floating gates; these gates are common to, respectively, νMOS 101 and 102, and 103 and 104. Reference numerals 107, 108, 109, and 110, indicate, respectively, input gates, while $C_1$ and $C_2$ represent capacitive coupling coefficients between input gates 107 and 108 and floating gate 105, respectively; these are identical in the case of the capacitive coupling coefficients between 109 and 110 and floating gate 106.

Reference numeral 111 indicates a standard inverter circuit; this conducts the digital inversion of input 112 and obtains the output 113 of the circuit.

Reference numeral 114 indicates an analog inverter; in response to the voltage change, from 0 volts to $V_{DD}$, of the analog input signal $V_y$ of the input terminal 115 of the present invention, this circuit outputs an inversion voltage signal 116 (=$V_{DD}-V_y$) from $V_{DD}$ to 0 volts.

Inversion output 116 is connected to 108, which is the input gate electrode of νMOS inverter 124, and 110 which is the input gate electrode of νMOS inverter 125.

The input signal voltage $V_x$ which is inputted into the other input terminal 117 of the circuit of the present embodiment is inputted into the $-\delta$ level shifter 118 and the $+\delta$ level shifter 119, where, respectively, the $-\delta$ and $+\delta$ voltage level addition and subtraction are performed; these are connected to, respectively, the input electrode 107 of νMOS inverter 124 and input 120 of control switch 123. Accordingly, the voltage of input gate electrode 107 is $V_x-\delta$, while the voltage of the input 120 of the control switch is $V_x+\delta$.

Control switch 123 uses the output 121 of the νMOS inverter 124 as a control signal; if the output 121 is "1" ($V_{DD}$), the input gate electrode 109 of the νMOS inverter and the output 120 of the +δ-level shifter 119 are connected, while when the output 121 is "0" (0 V), then the input gate electrode 109 and a terminal 122 connected to the common ground of the circuit are connected.

In order to explain the circuit operation of νMOS inverters 124 and 125, first, the structure and operational principle of the νMOS will be explained. FIG. 2(a) depicts an example of the cross sectional structure of a 4-input N-channel νMOS transistor (N-νMOS); reference numeral 201 indicates, for example, a P-type silicon substrate, reference numerals 202 and 203 indicate a source and a drain formed by N⁺ diffusion layers, reference 204 indicates a gate insulating film (for example, a $SiO_2$ film) which is provided on a channel region 205 between the source and the drain, reference numeral 206 indicates a floating gate electrode which is electrically insulated and is in a potentially floating state, reference 207 indicates an insulating film comprising, for example, $SiO_2$ or the like, and reference numerals 208a, 208b, 208c, and 208d indicate electrodes which serve as input gates. FIG. 2(b) shows a simplified version of this for the purposes of analyzing the νMOS operation. If the capacitive coupling coefficients between each input gate electrode and the floating gate are represented, as shown in the diagram, by $C_1$, $C_2$, $C_3$, and $C_4$, and the capacitive coupling coefficient between the floating gate and the silicon substrate is represented by $C_0$, then the potential $\Phi_F$ of the floating gate is given by the following formula.

$$\Phi_F = (1/C_{TOT})(C_1V_1+C_2V_2+C_3V_3+C_4V_4)$$

Here, $C_{TOT} \equiv C_0+C_1+C_2+C_3+C_4$ Reference numerals $V_1$, $V_2$, $V_3$, and $V_4$ indicate the voltages applied to, respectively, input gates 208a, 208b, 208c, and 208d, and the potential of the silicon substrate is 0 V, that is to say, it is grounded.

Now, the potential of the source 202 is set to 0 V. That is to say, it is set to a value measured using the potential of all electrodes as a source standard. By doing this, the νMOS shown in FIG. 2 becomes identical to a standard N-channel MOS transistor if the floating gate 206 is viewed as a standard gate electrode, and when the gate potential $\Phi_F$ thereof exceeds a threshold value ($V_{TH}^*$), then an electron channel (N-channel) is formed in the region 205 between the source 202 and the drain 203, and the source and drain are electrically connected. That is to say, the νMOS is conductive (ON) when the following conditions are met:

$$(1/C_{TOT})(C_1V_1+C_2V_2+C_3V_3+C_4V_4) > V_{TH}^*$$

The foregoing explanation referred to a N-channel νMOS transistor; however, there are also devices in which, in FIG. 2(a), the source 202, the drain 203, and the substrate 201 are all of the opposite conductivity type. That is to say, in this νMOS, the substrate is an N-type substrate, and the source and drain are formed from $P^+$ diffusion layers; this is termed a "P-channel MOS transistor" (P-νMOS).

Next, the operation of the νMOS inverter 124 shown in FIG. 1 will be explained.

If the potential of the floating gate 105 is represented by $\Phi_{FA}$, then the following formula obtains:

$$\Phi_{FA} = \{C_1(V_x-\delta) + C_2(V_{DD}-V_y)\}/C_{TOT} \quad (1)$$

and when $\Phi_{FA}$ exceeds the inversion voltage $V_{TH}^*$ of the inverter as seen from the floating gate, that is to say, when the following conditions are fulfilled:

$$\Phi_{FA} = \{C_1(V_x-\delta) + C_2(V_{DD}-V_y)\}/ > V_{TH}^* \quad (2)$$

the inverter 124 enters an ON state, and the output thereof inverts (0 V is outputted). Now, in order to simplify the explanation, it will be assumed that the condition $C_0 \ll C_1 + C_2$ is met, and that $C_0$ can be ignored. That is to say, it is assumed that $C_{TOT} = C_1 + C_2$. It is of course the case that the following explanation will be completely identical, even if $C_0$ has a value approximately equal to $C_1 + C_2$.

Figure 1:
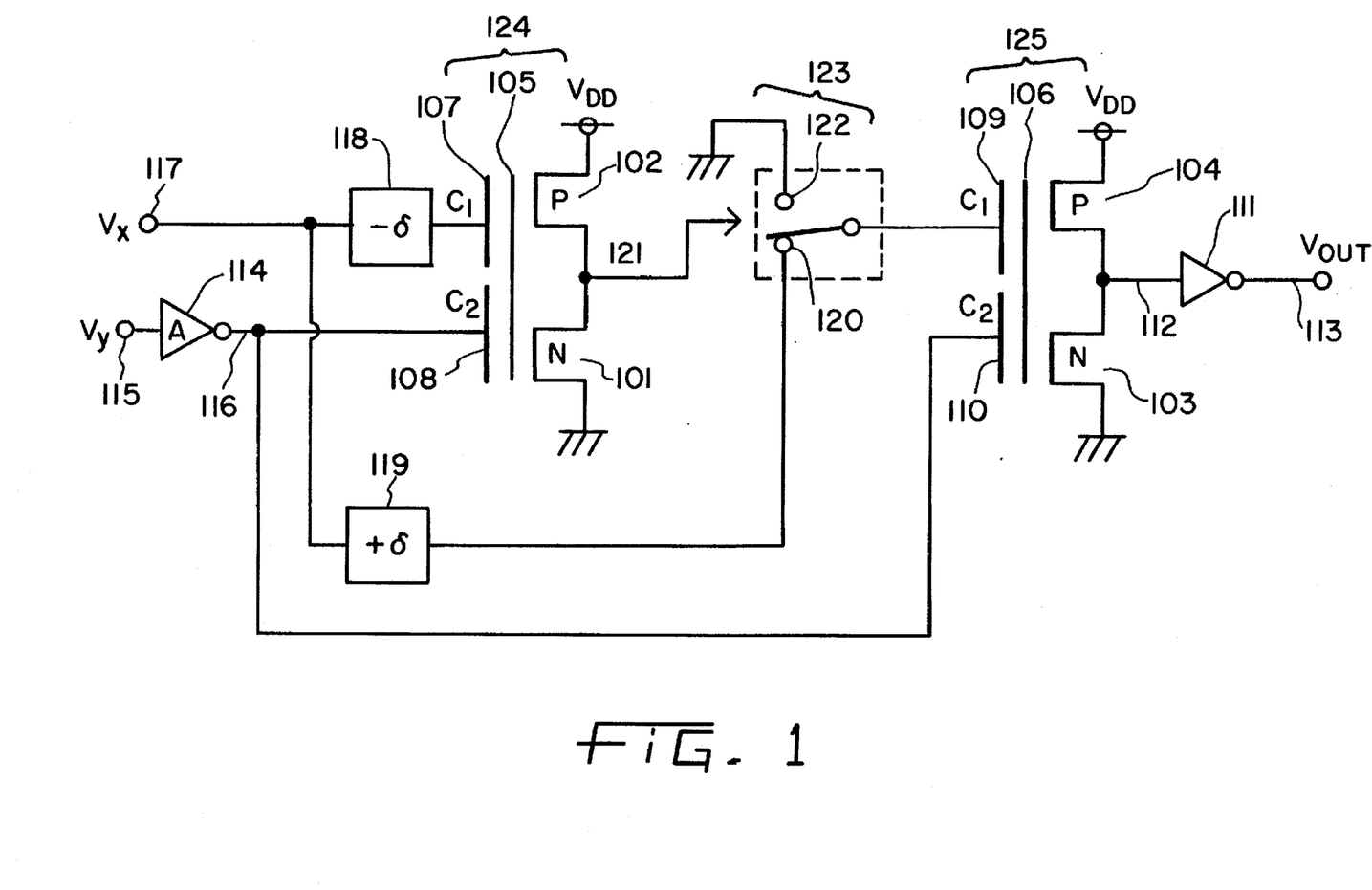
FIG. 1 is a schematic structural circuit diagram showing a first embodiment of the present invention.
Figure 2A:
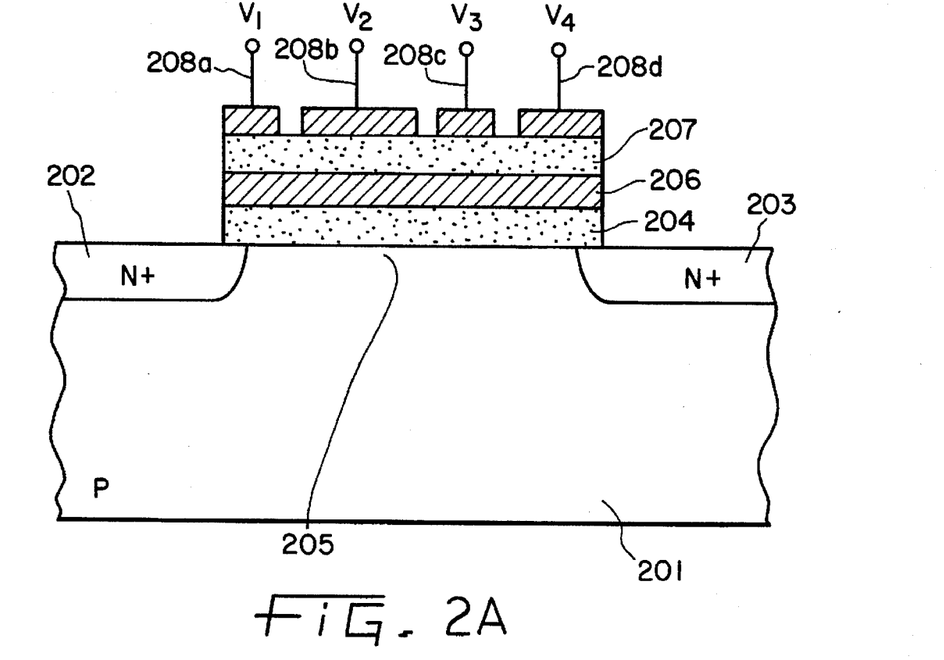
FIGS. 2(a) and 2(b) are a schematic structural diagram of a vMOS transistor.
Figure 2B:
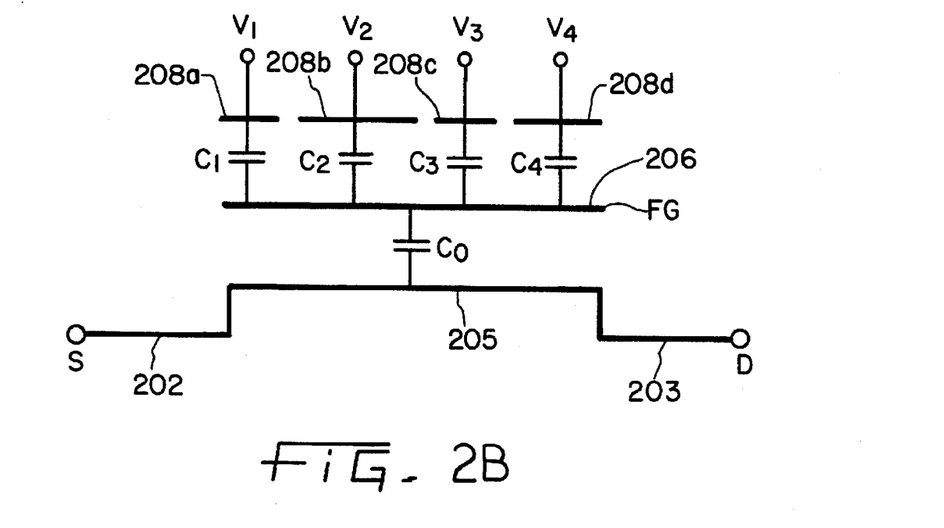

In the circuit shown in FIG. 1, setting is conducted such that, for example, $C_1 = C_2$. Furthermore, the value of $V_{TH^*}$ is set to, for example, so that, $V_{DD}/2$, that is to say, if $V_{DD}$ has a value of 5 V, this value is set to 2.5 V. It is of course the case that these values may be altered where necessary.

Under the above conditions, the conditions under which νMOS inverter 124 enters an ON state and outputs "0" are, from Formula (2), $$V_x - V_y > +\delta \quad (3)$$

On the other hand, the conditions under which νMOS inverter 124 outputs a value of "1" are $$V_x - V_y < +\delta \quad (4)$$

Next, the operation of νMOS inverter 125 will be explained.

The output of control switch 123 is connected to input gate electrode 109. Accordingly, when the output of νMOS inverter 124 is "1", that is to say, when the conditions of Formula (4) are fulfilled, the output of the +δ level shifter 119 is applied to the input gate electrode 109, and when the output of νMOS inverter 124 is "0", that is to say, when the conditions of Formula (3) are fulfilled, the ground voltage (0 V) is applied.

Now, it will be assumed that the conditions of Formula (4) are fulfilled, that is to say, that $V_x-V_y$ is smaller than +δ. Accordingly, the output $V_x+\delta$ of level shifter 119 is applied to input gate electrode 109. Furthermore, as in the case of νMOS inverter 124, the analog inversion voltage of input $V_y$ is applied to input gate electrode 110. Accordingly, if the potential of the floating gate 106 is represented by $\Phi_{FB}$, then the following formula results:

$$\Phi_{FB} = \{(V_x+\delta) + (V_{DD}-V_y)\}/2 \quad (5)$$

Accordingly, when $\Phi_{FB}$ becomes larger than the inversion threshold value $V_{DD}/2$ of the inverter, that is to say, when:

$$\Phi_{FB} = \{(V_x+\delta) + (V_{DD}-V_y)\}/2 > V_{DD}/2 \quad (6)$$

$$\therefore V_x - V_y > -\delta \quad (7)$$

νMOS inverter 125 inverts, and the output 112 thereof becomes "0". Accordingly, the output 113 of the present circuit, which is logically inverted by means of a standard inverter 111, becomes "1", and the voltage $V_{OUT}$ thereof becomes $V_{DD}$, that is to say, 5 V.

On the other hand, when the conditions are those shown in formula (3) rather than those shown in formula (4), that is to say, when $V_x - V_y \geq +\delta$, input gate electrode 109 is grounded, and 0 V is applied. Accordingly, the potential $\Phi_{FB}$ of floating gate electrode 106 is:

$$\Phi_{FB}' = (V_{DD}-V_y)/2 \quad (8)$$

and this is constantly smaller than the inversion threshold value $V_{DD}/2$ irrespective of the input voltage $V_y$. Accordingly, when $V_x - V_y > +\delta$, the output 113 of the present circuit is always "0".

Summing up the above, in the case of inputs $V_x$ and $V_y$ which satisfy the conditions that $V_x - V_y$ is smaller than +δ and is greater than −δ, that is to say:

$$-\delta < V_x - V_y < +\delta \quad (9)$$

that is to say, when the difference between $V_x$ and $V_y$ is within a range of ±δ, then the present circuit outputs "1" (the voltage $V_{DD}$).

In the present embodiment, the −δ level shifter is disposed at the input gate electrode 107 to which the input 117, which is not subjected to analog inversion, is connected; however, this level shifter may be disposed immediately before any of the input gate electrodes of the νMOS inverter 124, So that for example, it may be disposed immediately before the input gate electrode 108.

The analog inverter 114 is connected to the input 115 of the circuit; however, it may be connected to the input 117, and $V_x$ thus inverted.

Furthermore, the composition is such that when the difference between the two inputs is within a range of +δ, the output 113 of the circuit is "1"; however, the composition may be such that by removing inverter 111, or by adding an odd number of inverters in series, or alternatively by some other method, the output 113 of the circuit is "0" when the difference between the two inputs is within a range of ±δ.

Additionally, level shifters 118 and 119 are circuits which conduct the voltage addition of −δ and +δ, the absolute value of which is equivalent; however, if the matching range need not be symmetrical, or if the range is designed so as not to be symmetrical, the absolute values need not be equivalent and in some cases, one or the other of the level shifters need not be present. Furthermore, for the same reasons, the two capacitive coupling coefficients $C_1$ and $C_2$ may be different.

Furthermore, two inputs were used as the number of input gates of νMOS inverters 124 and 125; however, one or more groups of gate electrodes having capacitive coupling coefficients connected to $V_{DD}$, and the ground, respectively, may be added, so that the number of input gates may be a number other than two.

(Embodiment 2)

Figure 3:
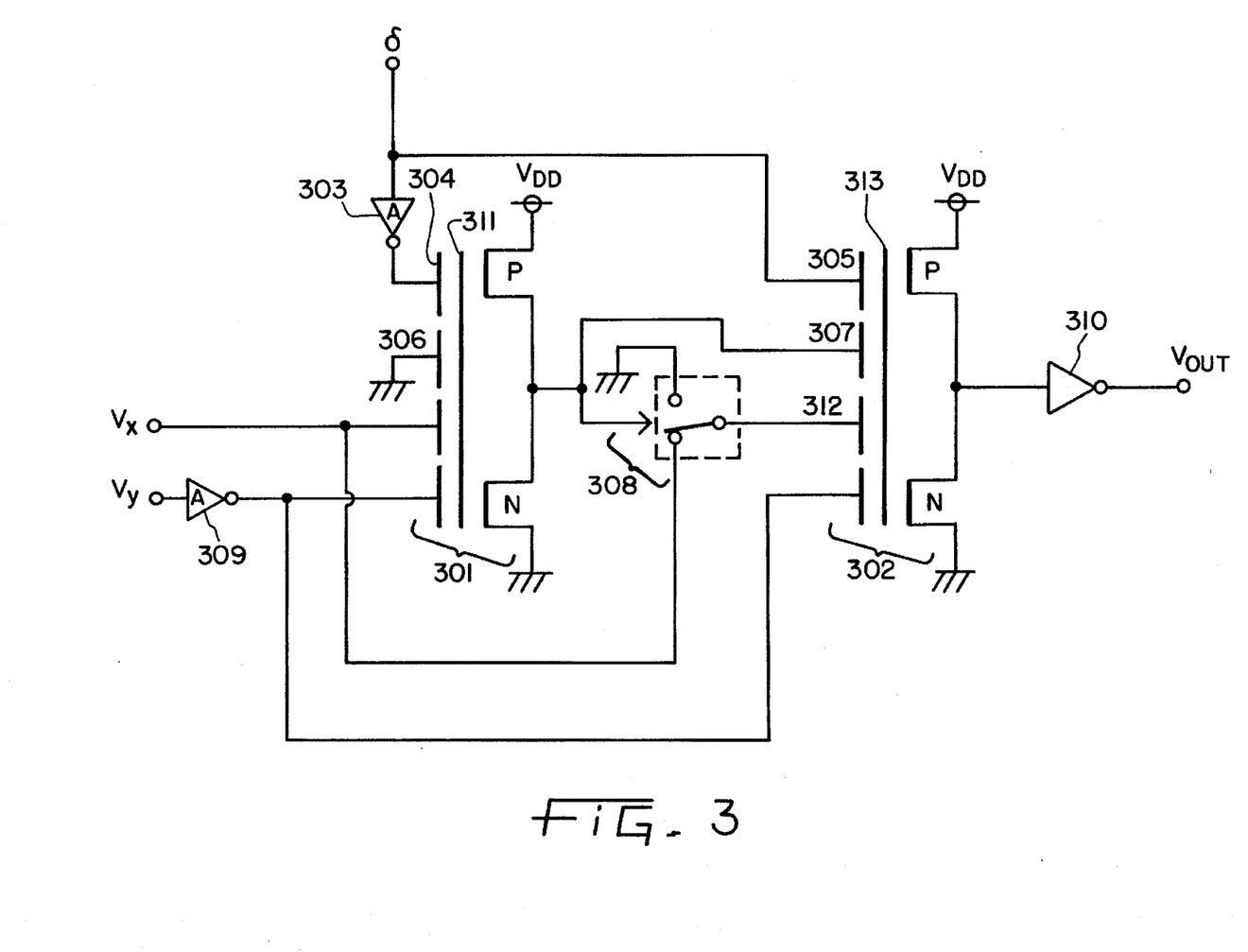
FIG. 3 is a schematic structural circuit diagram showing a second embodiment of the present invention.

A second embodiment of the present invention is shown in FIG. 3.

The two νMOS inverters 301 and 302 have four input gate electrodes having equivalent capacitive coupling coefficients.

Furthermore, in addition to $V_x$ and $V_y$, a control input δ is present, and the signal thereof is connected to the input gate electrode 304 of the νMOS inverter 301 via analog inverter 303, or, alternatively, this δ signal is connected to the input gate 305 of νMOS inverter 302.

The output of νMOS inverter 301 controls the control switch 308, and is inputted into input gate 307 of νMOS inverter 302.

Parts other than those described above, for example, control switch 308 or the analog inverter 309 of the input portion, as well as the standard inverter 310 of the output portion, and the like, have structures and functions which are identical to those in the case of the first embodiment, so that a description thereof will be omitted here.

A signal $V_{DD}-δ$, which represents an analog inversion of control signal δ, and the ground potential (0 V) are applied to, respectively, input electrodes 304 and 306 of νMOS inverter 301. Furthermore, $V_x$ and $V_{DD}-V_y$, which represents the analog inversion of $V_y$, are applied to the other two input gate electrodes. Accordingly, the potential $Φ_{FA}$ of the floating gate electrode 311 is:

$$Φ_{FA}=\{V_x+(V_{DD}-V_y)+(V_{DD}-δ)\}/4 \qquad (10)$$

Accordingly, the conditions under which νMOS inverter 301 inverts and outputs "0" are as follows:

$$Φ_{FA}=\{V_x+(V_{DD}-V_y)+(V_{DD}-δ)\}/4>V_{DD}/2 \qquad (11)$$

$$∴V_x-V_y>+δ \qquad (12)$$

The conditions under which νMOS inverter 301 outputs "1" are:

$$V_x-V_y<+δ \qquad (13)$$

This is identical to the function of νMOS inverter 124 in embodiment 1.

On the other hand, when the conditions shown in Formula (13) are met, the potential $Φ_{FB}$ of the floating gate 313 of νMOS inverter 302 is:

$$Φ_{FB}=\{V_x+(V_{DD}-V_y)+V_{DD}+δ\}/4 \qquad (14)$$

Accordingly, when $Φ_{FB}$ is larger than the inversion threshold value $V_{DD}/2$ of the inverter, that is to say, when:

$$Φ_{FB}=\{V_x+(V_{DD}-V_y)+V_{DD}+δ\}/4>V_{DD}/2 \qquad (15)$$

$$∴V_x-V_y>-δ \qquad (16)$$

νMOS inverter 302 inverts, and the output thereof is "0". Accordingly, the output of the present circuit logically inverted by means of a standard inverter 310, is "1", and the voltage $V_{OUT}$ thereof is $V_{DD}$, that is to say, 5 V.

On the other hand, when the conditions are not those shown in Formula (13), but rather those shown in Formula (12), that is to say, when $V_x-V_y>+δ$, input gate electrodes 307 and 312 are grounded, and 0 V is applied thereto. Accordingly, the potential $Φ_{FB}'$ of the floating gate electrode 313 becomes:

$$Φ_{FB}'=(V_{DD}-V_y+δ)/4 \qquad (17)$$

so that this is constantly smaller than the inversion threshold value $V_{DD}/2$, irrespective of input voltage $V_y$, or control voltage δ. Accordingly, when $V_x-V_y>+δ$, the output of the present circuit is "0".

Summing up the above, in the case of inputs $V_x$ and $V_y$ which satisfy the conditions that $V_x-V_y$ is smaller than $+δ$ and larger than $-δ$, that is to say, $$-δ<V_x-V_y<+δ \qquad (18)$$

that is to say, when the difference between $V_x$ and $V_y$ is within a range of ±δ, the present circuit outputs "1" (voltage $V_{DD}$). Furthermore, δ is an externally applied control signal, so that the matching range (2δ from −δ to +δ) is also variable.

In the present embodiment, the analog inverter 309 was connected to the input $V_y$ of the circuit; however, it may be connected to input $V_x$, so that $V_x$ is inverted.

Furthermore, the composition is such that the output $V_{OUT}$ of the circuit is "1" when the difference between the two inputs within a range of ±δ; however, a composition is also possible in which, by removing inverter 310, or by adding an odd number of inverters in series, or alternatively, by means of some other method, the output of the circuit is "0" when the difference of the two inputs is within a range of ±δ.

Furthermore, control signal δ is inputted into input gate 304 after being subjected to analog inversion, and is inputted into input gate 305 in an unchanged manner; however, if the matching range need not be symmetrical, or if this range is designed to be non-symmetrical, such a composition is not necessary, and in some cases, one or the other of the input gates may be omitted. Furthermore, it is possible to apply two differing control signal voltages to the two-input gates. Additionally, for the same reasons, the input capacitive coefficients of the four input gates of the νMOS inverter may be different.

Furthermore, four inputs were used as the number of input gates of νMOS inverters 301 and 302; however, one or more groups of gate electrodes having capacities connected to, respectively, $V_{DD}$ and the ground, may be added, and thus the number of input gates may be a number other than 4.

(Embodiment 3)

Figure 4:
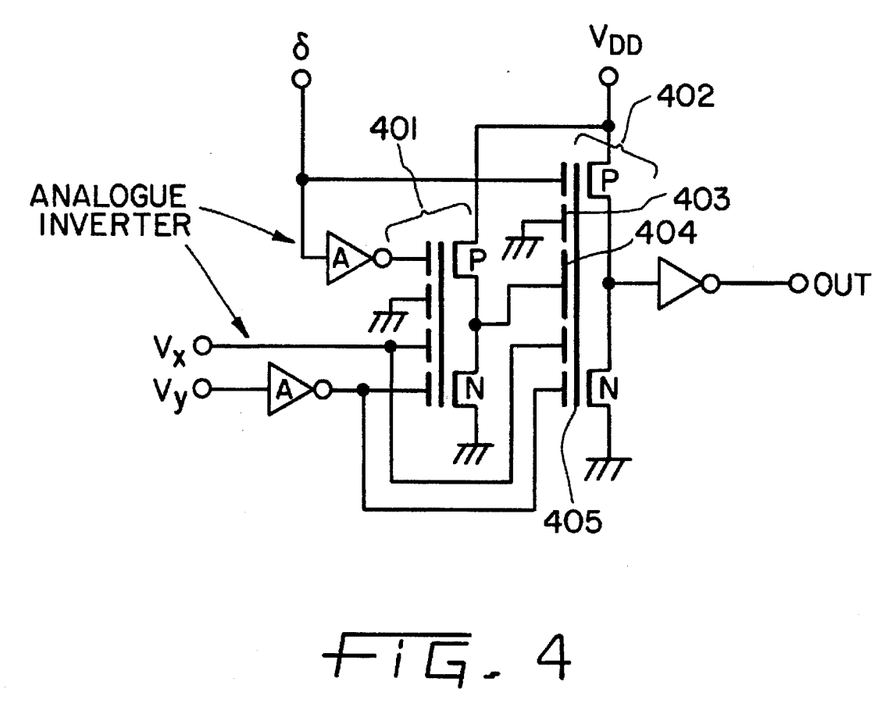
FIG. 4 is a schematic structural circuit diagram showing a third embodiment of the present invention.

A third embodiment of the present invention is shown in FIG. 4.

In the present embodiment, the number of input gates of νMOS inverter 402 is five. In comparison with the case of the νMOS inverter 302 of embodiment 2, the additional input gate 403 is grounded. Furthermore, the coupling capacity ratio of the input gate 404 into which the output of νMOS inverter 401 is directly inputted is twice as large as that of the other input gates.

Furthermore, the control switch which is controlled by means of the output of the νMOS inverter is removed, and the input $V_x$ is directly connected to the input gate of the νMOS inverter 402.

Other details of the composition of the circuit are identical to those in embodiments 1 and 2, so that a description thereof will be omitted here.

With respect to the operation of the νMOS inverter 401, this is identical to that of the νMOS inverter 301 of embodiment 2, so that a detailed explanation thereof will be omitted here; however, νMOS inverter 401 outputs "1" when the following conditions are met:

$$V_x - V_y < +\delta \quad (19)$$

When the conditions shown in Formula (19) are satisfied, the potential $\Phi_{FB}$ of the floating gate 405 of the νMOS inverter 402 is:

$$\Phi_{FB} = \{V_x + (V_{DD} - V_y) + 2V_{DD} + \delta\}/6 \quad (20)$$

and when this value exceeds the inversion threshold value $V_{DD}/2$ of the inverter, that is to say, when:

$$V_x - V_y > -\delta \quad (21)$$

νMOS inverter 402 inverts, and the output $V_{OUT}$ of the circuit is "1".

On the other hand, in the case in which the conditions shown in Formula (19) are not met, that is to say, when:

$$V_x - V_y > +\delta \quad (22)$$

the output of νMOS inverter 401, that is to say, the potential of the input gate 404 of νMOS inverter 402 is 0 V, and the potential of floating gate 405 of νMOS inverter 402 is:

$$\Phi_{FB}' = \{V_x + (V_{DD} - V_y) + \delta\}/6 \quad (23)$$

and this is always smaller than the inversion threshold $V_{DD}/2$, irrespective of the input voltage Vy or the control voltage δ, so that νMOS inverter 402 does not invert. Accordingly, when $V_x - V_y > +\delta$, the output of the present circuit is always "0".

Summarizing the above, in the case of inputs $V_x$ and $V_y$ which satisfy the conditions that $V_x - V_y$ is smaller than $+\delta$ and larger than $-\delta$, that is to say, $$-\delta < V_x - V_y < +\delta \quad (24)$$

that is to say, when the difference between $V_x$ and $V_y$ is within a range of $\pm\delta$, the present circuit outputs "1" (the voltage $V_{DD}$), Furthermore, δ is a control voltage which is externally applied, so that the matching range of the circuit (2δ from $-\delta$ to $+\delta$) is also variable.

In the present embodiment, the analog inverter which is connected to input $V_y$ may be connected to input $V_x$ so that $V_x$ inverts.

Furthermore, the composition is such that the output $V_{OUT}$ of the circuit is "1" when the difference between the two inputs is within a range of $\pm\delta$; however, a composition is also possible in which, by removing the final stage of the inverter, or by adding an odd number of inverters in series, or by some other method, the output of the circuit is "0" when the difference between the two inputs is within a range of $\pm\delta$.

Furthermore, the control voltage δ is inputted into the input gate of νMOS inverter 401 after being subjected to analog inversion, and is inputted into the input gate of νMOS inverter 402 in an unchanged manner; however, if the matching range need not be symmetrical, or if the range is designed so as not to be symmetrical, such a composition is not necessary, and in some cases, one or the other of the input gates may be omitted. Furthermore, two differing control signal voltages may be applied to the two input gates. Furthermore, for the above reasons, the input capacitive coefficients of the input gates of the νMOS inverter may be different.

Furthermore, four inputs and five inputs were used as the number of input gates of νMOS inverters 401 and 402; however, one or more groups of gate electrodes having capacities connected to $V_{DD}$ and the ground, respectively, may be added, so that the number of input gates may be a number other than four or five.

(Embodiment 4)

Figure 5:
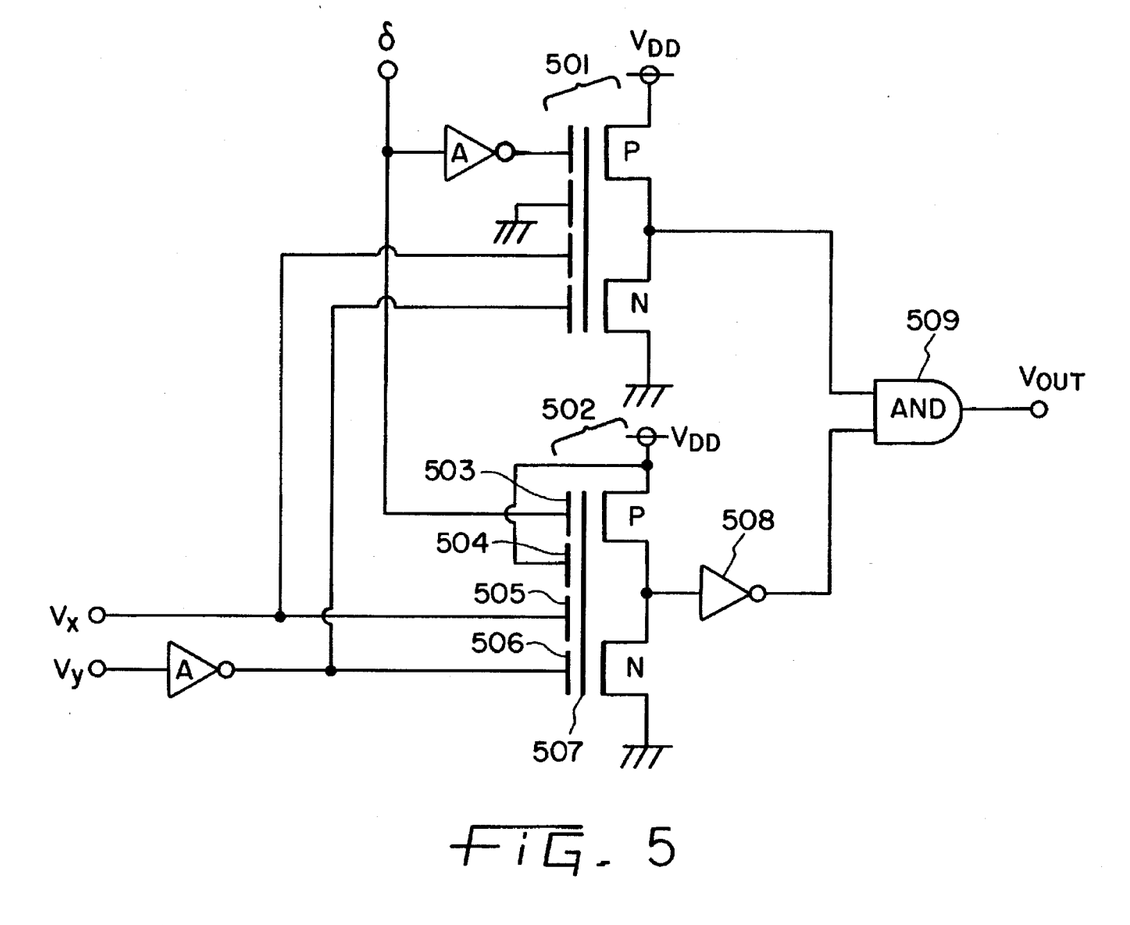
FIG. 5 is a schematic structural circuit diagram showing a fourth embodiment of the present invention.

A fourth embodiment of the present invention is shown in FIG. 5. In the present embodiment, νMOS inverters 501 and 502, which have four input gates having equal coupling capacity ratios, are connected in parallel.

δ, $V_{DD}$, $V_x$, and the analog inverted signal of $V_y$ are connected, respectively, to the input gates 503, 504, 505, and 506 of νMOS inverter 502.

The output of νMOS inverter 502 is digitally inverted by means of a standard inverter 508, and is inputted into AND circuit 509 together with the output of νMOS inverter 501.

With respect to the structure and operation of νMOS inverter 501, these are identical to those in the case of inverter 301 in embodiment 2 and inverter 401 in embodiment 3, so that a detailed explanation thereof will be omitted here; however, νMOS inverter 501 outputs "1" when the following conditions are met.

$$V_x - V_y < +\delta \quad (25)$$

On the other hand, the floating gate potential $\Phi_{FB}$ of the νMOS inverter 502 is:

$$\Phi_{FB} = \{V_x + (V_{DD} - V_y) + V_{DD} \delta\}/4 \quad (26)$$

Accordingly, when $\Phi_{FB}$ is larger than the inversion threshold at $V_{DD}/2$ of the inverter, that is to say, when $$\Phi_{FB} = \{V_x + (V_{DD} - V_y) + V_{DD} + \delta\}/4 > V_{DD}/2 \quad (27)$$

$$\therefore V_x - V_y > -\delta \quad (28)$$

νMOS inverter 502 inverts, and the output thereof is "0". Accordingly, the output which is logically inverted by means of the standard inverter 508 is "1" in the range satisfying the conditions of Formula (28).

The AND circuit 509 calculates the logical product of the two inputs thereof, that is to say, the logical inverted signals of the output of νMOS inverter 509 and the output of νMOS inverter 502, so that this circuit outputs "1" only when both of the logically inverted signals of the output of νMOS inverter 501 and the output of νMOS inverter 502 are "1".

Accordingly, the present circuit outputs "1" when the conditions in Formula (25) and Formula (28) are both satisfied. Accordingly, in the case of inputs $V_x$ and $V_y$ which satisfy the following conditions:

$$-\delta < V_x - V_y < +\delta \quad (29)$$

that is to say, when the difference between $V_x$ and $V_y$ is within a range of $\pm\delta$, the present circuit outputs "1" (the voltage $V_{DD}$), Furthermore, δ is a control signal which is externally applied, so that the matching range of the circuit (2δ from $-\delta$ to $+\delta$) is also variable.

In the present embodiment, the analog inverter connected to input $V_y$ may be connected to input $V_x$ and $V_x$ thus inverted.

The composition is such that the inverter 508 and the AND circuit 509 of the output portion output a "1" when the output of νMOS inverter 501 is "1" and the output of νMOS inverter 502 is "0"; however, other structures are possible so long as the circuit has a similar function, so that for example, an XOR (exclusive OR) circuit is also possible.

Furthermore, the composition is such that the output $V_{OUT}$ of the circuit is "1" when the difference between the two inputs is within a range of $\pm\delta$; however, a composition is also possible in which, by means of adding an odd number of inverters in series, or by means of another method, the output of the circuit is "0" when the difference between the two inputs is within a range of $\pm\delta$.

Furthermore, the control voltage $\delta$ is inputted into the input gate of the νMOS inverter 501 after being subjected to analog inversion, and is inputted into the input gate 503 of the νMOS inverter 502 in an unchanged manner; however, if the matching range need not be symmetrical, or if this range is designed so as not to be symmetrical, such a composition is not necessary, and in some cases, one or the other of the input gates may be omitted. Furthermore, two different control signal voltages may be applied to the two input gates. Furthermore, for similar reasons, the input capacity coefficients of the input gates of the νMOS inverter may differ.

Furthermore, four inputs were used as the number of input gates for νMOS inverters 501 and 502; however, one or more groups of gate electrodes having capacities connected to, respectively, $V_{DD}$ and the ground may be added, so that the number of input gates is not limited to four.

Figure 6:
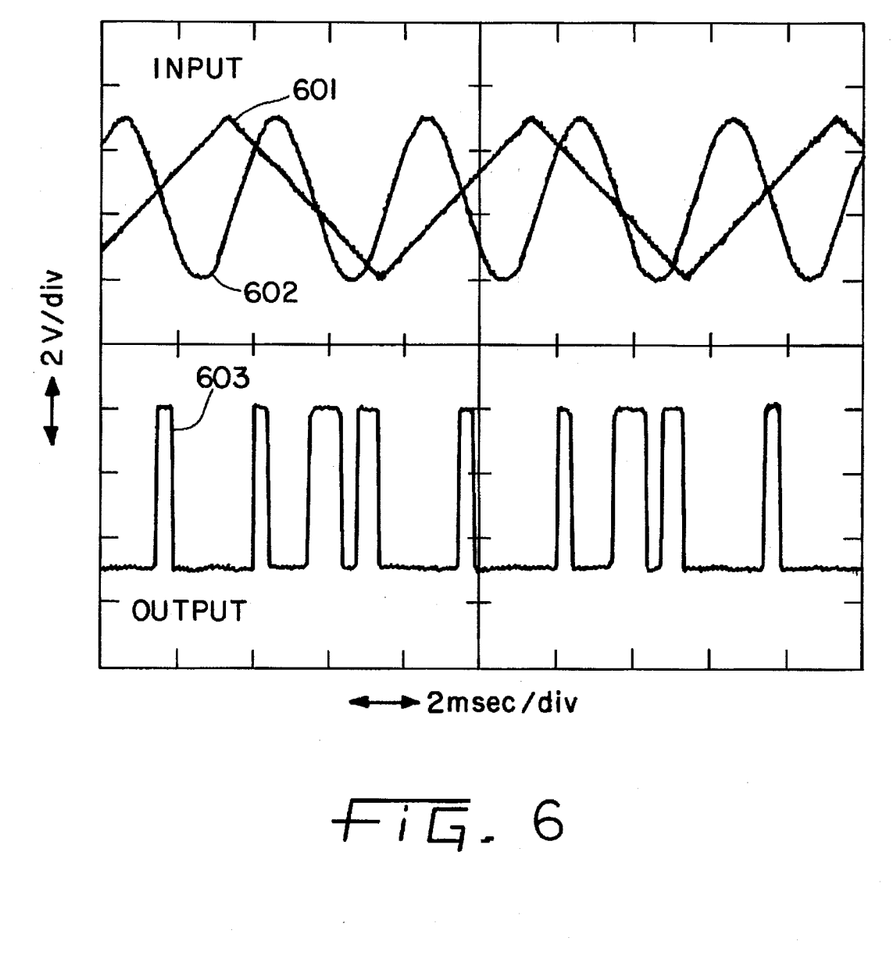
FIG. 6 shows the results of a measurement using the circuit of the fourth embodiment of the present invention.

In FIG. 6, the output of the data matching operation measured using the present circuit is shown. In FIG. 6, waveform 601 and waveform 602 are input waveforms having no correlation. Waveform 603 is the output of the present circuit which conducts matching using waveform 601 and waveform 602 as inputs. It can be seen that when the difference between waveform 601 and waveform 602 is less than or equal to a certain value, 5V is outputted.

Figure 7:
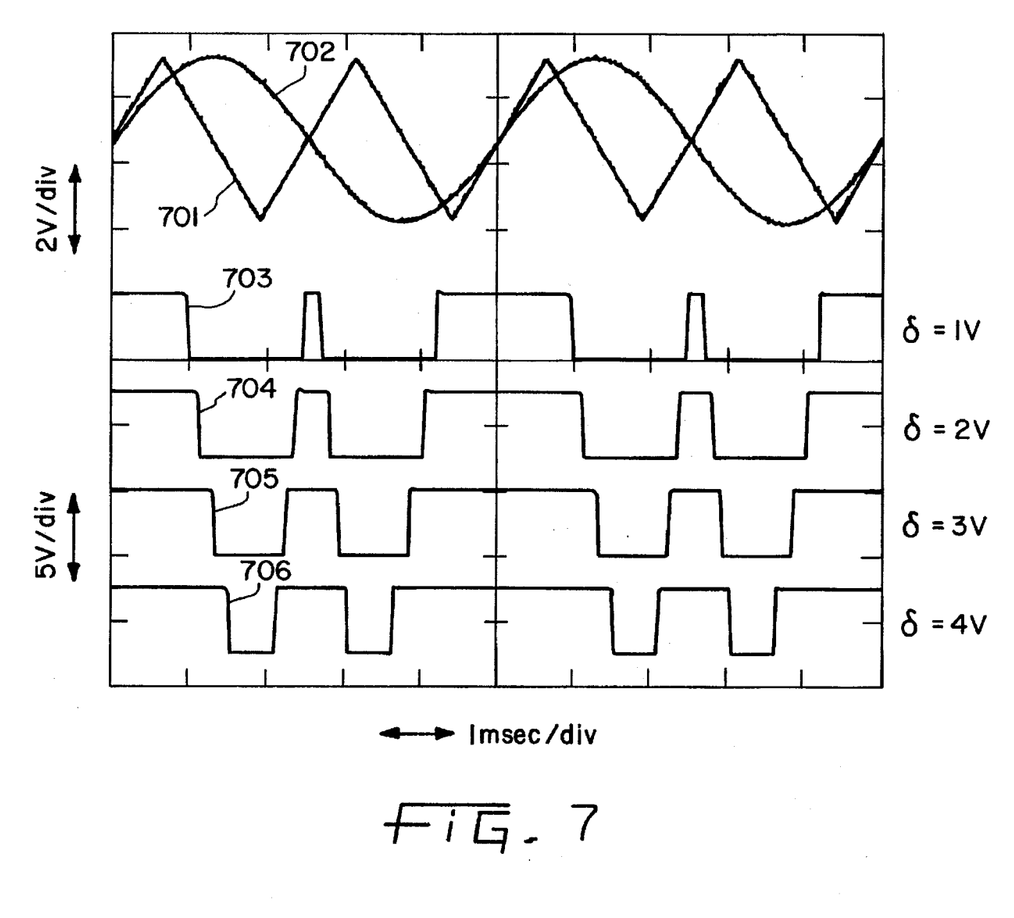
FIG. 7 shows the results of a measurement using the circuit of the fourth embodiment of the present invention when the control signal δ was altered.

In FIG. 7, a second data matching operation output measured using the present circuit is shown. In FIG. 7, waveform 701 and waveform 702 are in the input waveforms of the matching circuit. Waveforms 703, 704, 705, and 706 are the output waveforms of the present circuit; they correspond to cases in which, respectively, $\delta=1$ V, 2 V, 3 V, and 4 V is applied. It can be seen that the matching range changes based on the control signal $\delta$.

A circuit which conducts the matching operation of two input signals as described above can be realized by means of simple circuitry containing approximately two νMOS inverters.

With respect to the measurement results of the circuits from embodiment 1 to embodiment 4, only those results relating to the circuitry of embodiment 4 are shown; however, it is of course the case that similar results can be obtained with the circuitry of the other embodiments.

Figure 8:
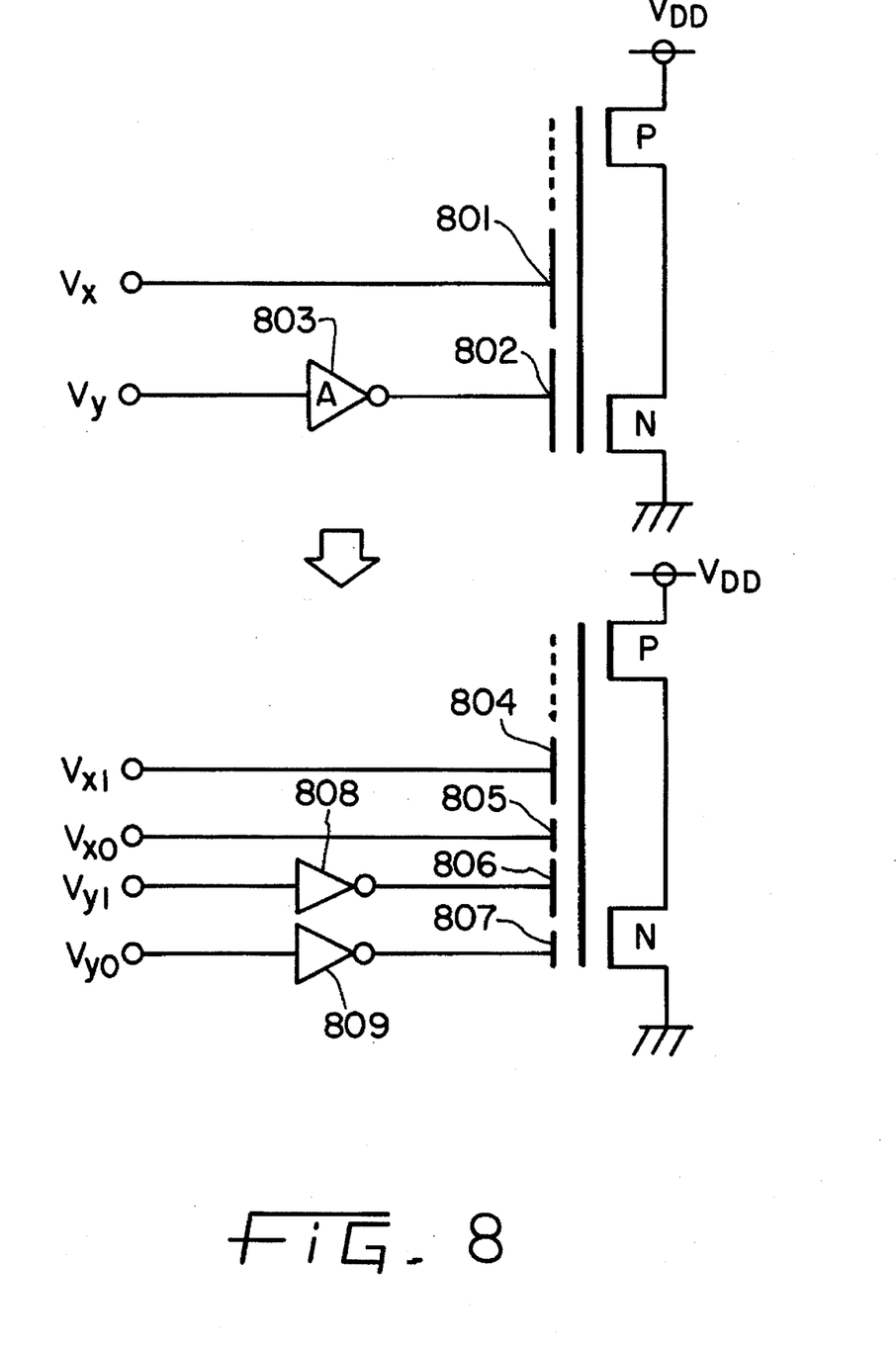
FIG. 8 is a schematic structural circuit diagram showing the input gate portion of the vMOS inverter in the case in which the input signals are two-bit digital signals.

Furthermore, from embodiment 1 through embodiment 4, only those cases were discussed in which analog signals were used as the inputs of the circuits; however, these may be, for example, multivalent signals, or digital signals. FIG. 8 shows an embodiment in the case in which in place of the analog signals $V_x$ and $V_y$, two-bit digital signals $V_{x0}$, $V_{x1}$ ($V_{x0}$ is the least significant bit) and $V_{y0}$, $V_{y1}$ ($V_{y0}$ is the least significant bit) ere added; only the input gate portion of the νMOS inverter is depicted. The input gate electrodes 801 and 802 in the case of an analog input are divided into, respectively, the two input gate electrodes 804 and 805, and 806 and 807. The capacitive coupling ratio of input gates 804 and 805 is 2:1, and the D/A conversion of the two-bit signal is conducted at this-input gate portion. This is similar with respect to input gates 806 and 807. Furthermore, at this time, the analog inverter 803 which analog inverts the input signal is replaced with two digital inverters 808 and 809. When the input is digital signals, signal inversion can be executed by means of digital processing. In the foregoing, the digital input of inputs $V_x$ and $V_y$ was discussed; however, it is of course the case that a similar discussion could be made with respect to the input method of the control signal $\delta$.

Additionally, in all embodiments, the νMOS inverters all had a CMOS structure; however, it is of course the case that these many be NMOS, E/E, or E/D inverters, or may be other types of inverter circuits.

Furthermore, only that case was discussed in which the floating gates of the all the νMOS inverters were operated so as to be in a constantly floating state; however, switching transistors may be connected to the floating gates, and based on the ON or OFF state of these transistors the potential of the floating gates may be fixed at an appropriate predetermined value. By means of this, it is possible to alter the thresholds of the νMOS inverters, or to refresh the charge implanted in the floating gates during operation.

Figure 9:
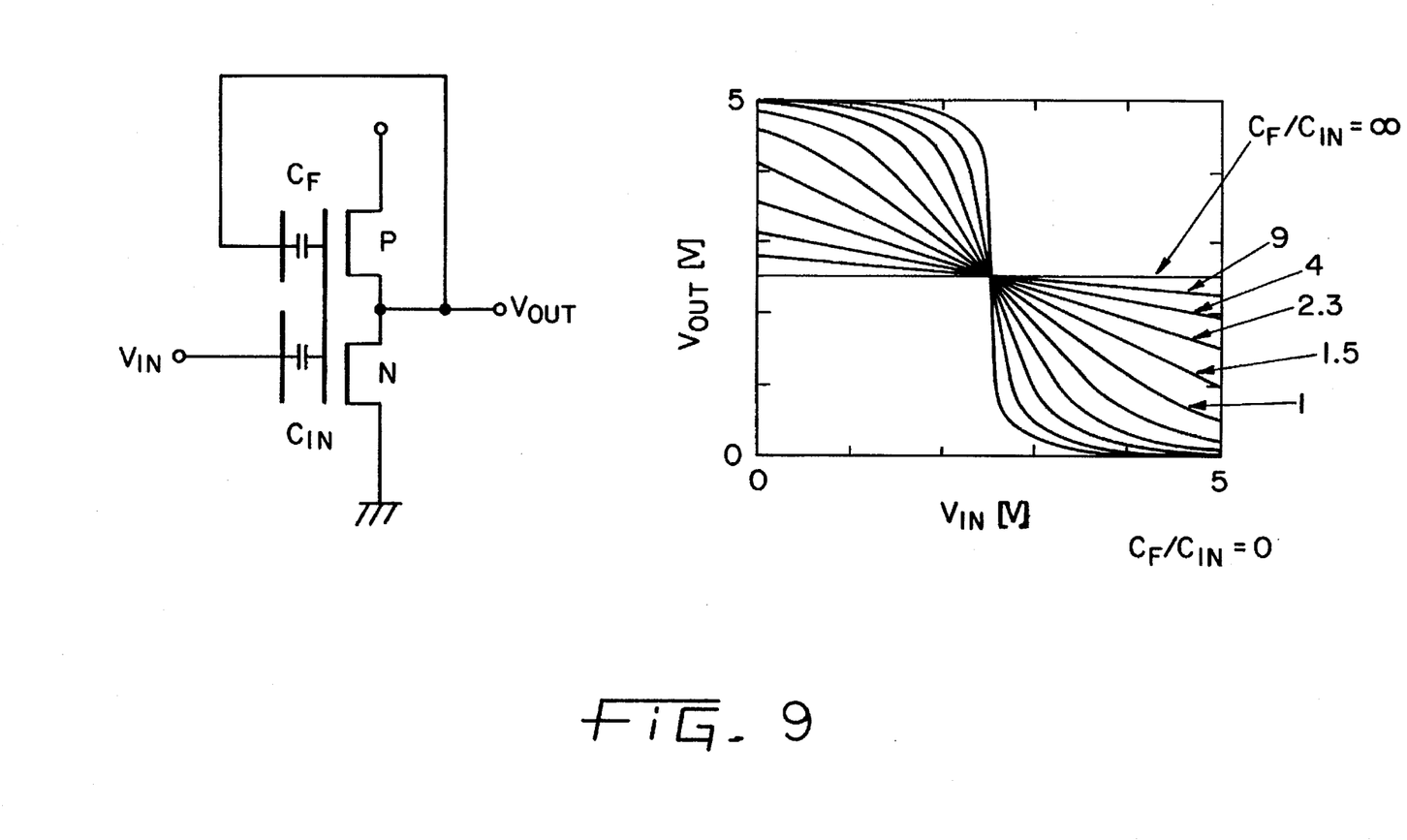
FIG. 9 is a circuit diagram showing an example of an analog inverter, and a characteristic diagram thereof.

In the foregoing embodiments, it is preferable that the analog structure shown on the left-hand side of FIG. 9 be employed. The right-hand side of FIG. 9 is a graph of experimental data showing the input and output characteristics of the circuit shown on the left-hand side.

In accordance with the present invention, the data matching operation of two inputs can be executed by means of an extremely simple circuit and at high speed. Additionally, because the surface area occupied by one circuit is small, it is possible to integrate a large number of matching circuits, and by means of parallel matching operations, it is possible to conduct the matching of an extremely large amount of data at high speed.

In accordance with the present invention, the matching width of the matching operation can be controlled externally so that application to a wide range of fields is possible.

We claim:

1. A semiconductor integrated circuit, comprising: a first input terminal for carrying a first signal representing a first value;

a second input terminal for carrying a second signal representing a second value;

first and second inverters, each said inverter having a plurality of input gates and an output, each said inverter comprising a neuron transistor, each said neuron transistor comprising a semiconductor region of one conductivity type disposed on a substrate, a source region and a drain region of a conductivity type opposite to said semiconductor region provided within said semiconductor region, a floating gate electrode having a floating potential and isolated from said source region and said drain region, said floating gate electrode capacitively coupled to said semiconductor region by means of a first insulation film, and a plurality of input gate electrodes capacitively coupled to said floating gate electrode by means of a second insulating film and respectively coupled to said inverter input gates, said first and second terminals respectively connected to a first and second input gate of each said inverters; and an output terminal connected to at least one of said first and second inverter outputs, said output terminal carrying an output signal, said output signal representing a first predetermined value when the difference between said first and second values is smaller than a predetermined difference value.

2. The semiconductor integrated circuit according to claim 1, further comprising a third input terminal, said third input terminal carrying a third signal, said third input terminal connected to a third input gate of at least one of said first and second inverters, said predetermined difference value determined by the application of said third signal to said third input terminal.

3. The semiconductor integrated circuit according to claim 1, wherein said first and second inverters are connected in series.

4. The semiconductor integrated circuit according to claim 3, further comprising a control switch disposed between said first inverter output and one of said second inverter input gates, wherein said one of said second inverter input gates carries one of a grounded signal and a signal based on said first signal in response to the operation of said control switch.

5. The semiconductor integrated circuit according to claim 1, wherein said first and second inverters are connected in parallel.

* * * * *